July 14, 1942.　　M. W. NENNEMAN　　2,289,724
HOSE CLAMPING DEVICE
Filed Dec. 13, 1940
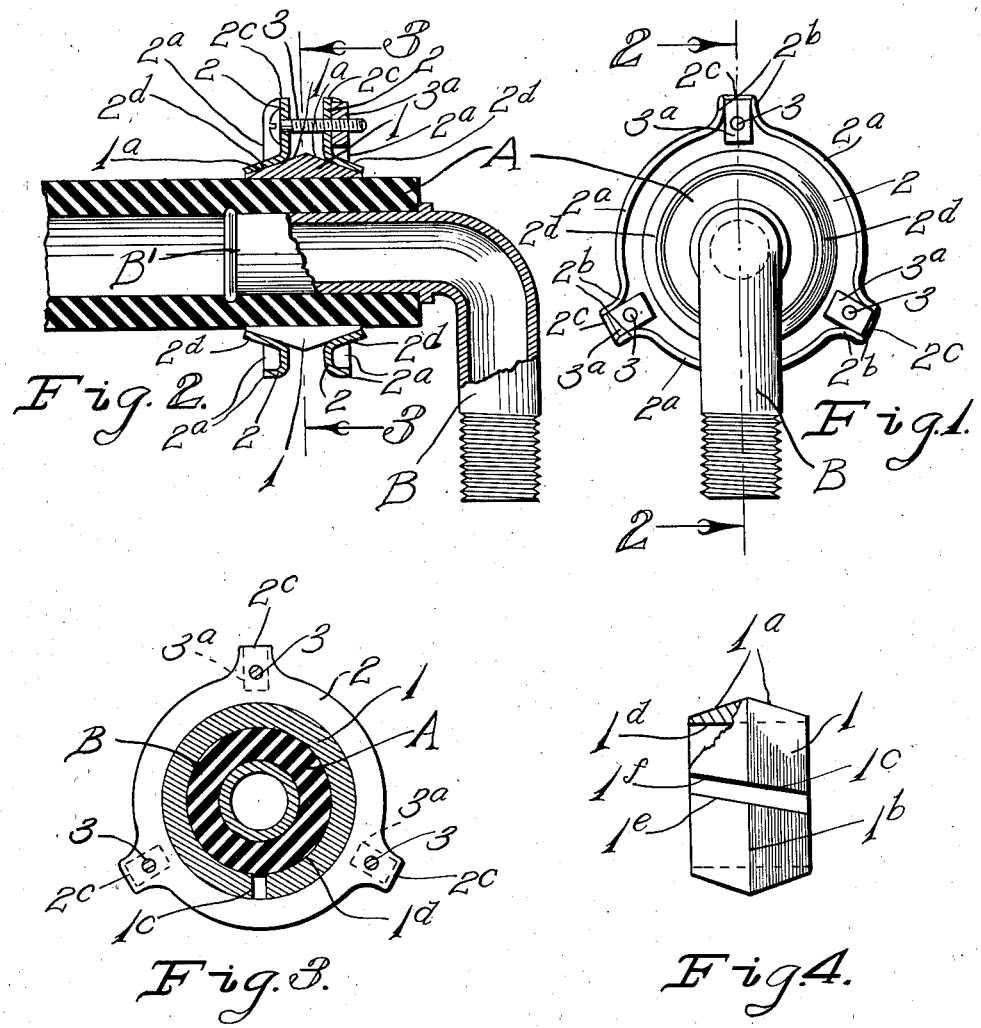

Patented July 14, 1942

2,289,724

UNITED STATES PATENT OFFICE 2,289,724

HOSE CLAMPING DEVICE

Milton W. Nenneman, Oakland, Calif.

Application December 13, 1940, Serial No. 369,927

2 Claims. (Cl. 285—82)

My invention relates to a hose clamping device, more particularly a clamping device adapted for use in securing rubber or like flexible hoses on the outer sides of solid tubular fluid conductors near the end portions of said hollow tubular fluid conductors and the objects of my invention are:

First, to provide a hose clamping device of this class which is very positive and strong in its clamping connected relation with various hoses and corresponding internally engaging fittings;

Second, to provide a hose clamping device of this class in which hoses are uniformly engaged upon the peripheral outer side thereof providing efficient circumferential clamping engagement of my hose clamping device with various hoses;

Third, to provide a hose clamping device of this class which is very light, compact and strong in proportion to its utility and is therefore admirably adapted for use in connection with fluid conductor line assembly of airplanes or the like;

Fourth, to provide a hose clamping device of this class in which the collar engaging clamp members are substantially annular and are provided with outlining flange portions arranged to provide great relative strength in proportion to the weight and bulk thereof;

Fifth, to provide a hose clamping device of this class in which the annular band-like hose engaging collar is provided with a slotted portion therein disposed at an angle to the axis thereof arranged for circumferential engagement with the entire peripheral outer side wall of various hoses;

Sixth, to provide a novel hose clamping device of this class;

Seventh, to provide a hose clamping device of this class in which outlining flange portions of the collar engaging clamp members engage the bolt nuts for locking the same in position relatively with their respective bolts; and Eighth, to provide a hose clamping device of this class which is very simple and economical of construction, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is an end elevational view of my hose clamping device shown positioned over the outer peripheral side of a flexible hose in the end of which is positioned a solid tubular elbow shaped fluid conductor member; Fig. 2 is a fragmentary sectional view taken from the line 2—2 of Fig. 1 showing parts and portions in elevation to facilitate the illustration; Fig. 3 is a sectional view taken from the line 3—3 of Fig. 2 and Fig. 4 is a detail elevational view of the hose engaging collar of my hose clamping device showing a portion thereof broken away and in section to facilitate the illustration.

Similar characters of reference refer to similar parts and portions throughout the several views of the drawing.

The hose engaging collar 1, collar engaging clamp members 2, and the clamping bolts 3 constitute the principal parts and portions of my hose clamping device.

The hose engaging collar 1 is an annular band-like member and is arranged to be fitted over the outer peripheral side of various flexible hoses. It is provided with an internal bore 1d and the outer side thereof is provided with smooth inwardly and angularly converging annular portions 1a which terminate centrally at the middle annular portion 1b of the hose engaging collar 1, all as shown best in Fig. 4 of the drawing. This hose engaging collar 1 is provided with a cutaway slotted portion 1c in the side wall thereof, as shown best in Figs. 3 and 4 of the drawing. This cutaway slotted portion 1c is angularly disposed relatively with the axis of the collar member 1 providing uniform engaging relation of the bore 1d with the outer side of a flexible hose due to the angular relation of said slotted portion 1c which is so arranged that opposite sides of the slotted portion 1c are arranged to conform to each other in axial aligned relation maintaining engagement with the entire periphery of the outer side of the hose A, as shown in Fig. 3 of the drawing.

Positioned on the inclined angular surfaces 1a of the collar 1 in opposed relation to each other are the collar engaging clamp members 2. These collar engaging clamp members 2 are duplicate and are each provided with radially extending protruding portions 2c as shown best in Figs. 1 and 3 of the drawing. These collar engaging clamp members 2 are formed of sheet metal and the radially extending protruding portions 2c are each provided with angularly extending flange portions 2b which are in continuity with the flange portion 2a intermediate the radially extending protruding portions 2c, as shown best in Figs. 1 and 2 of the drawing. These flange portions 2a are at substantially right angles to the radially extending protruding portions 2c, as shown best in Figs. 1 and 2 of the drawing. These collar engaging clamp members 2 inwardly of the flange portions, 2a are provided with angularly disposed annular portions 2d which are arranged to engage the angular inclined surfaces 1a of the hose engaging collar 1, as shown best in Fig. 2 of the drawing.

Positioned in each of the radially extending protruding portions 2c of the collar engaging clamp members 2 is one of the bolts 3. Screw threaded on each of these bolts 3 is a nut 3a which is engaged at opposite sides by means of flange portions 2b, as shown best in Figs. 1 and 2 of the drawing. It will be noted that my hose clamping device is used in connection with flexible hoses and solid tubular fluid conductor members in substantially the relation as shown in Fig. 2 of the drawing wherein the hose engaging collar 1 is positioned over the outer side of the hose A near its one end in which is positioned the flange portion B' of the solid tubular fluid conductor B whereby my clamping device compresses the flexible hose A securely against the outer side of the hollow tubular fluid conductor member B near its portion B'.

The operation of my hose clamping device is substantially as follows: When it is desired to secure a flexible hose on a solid tubular fluid conductor in the relation as shown in Fig. 2 of the drawing, the bolts 3 are loosened in their respective screw threaded relation with the nuts 3a providing loose engaged relation of the portions 2d of the collar engaging clamp members 2 with the inclined portions 1a of the hose engaging collar 1 so that the hose engaging collar 1 may be readily placed over the outer surface of the hose A which is positioned over the end portion B' of the tubular fluid conductor B. The bolts 3 are then tightened in their screw threaded relation with the nuts 3a shifting the portions 2d of the collar engaging clamp members 2 inwardly upon the inclined surfaces 1a of the hose engaging collar 1 toward the middle portion 1b thereof compressing the hose engaging collar 1 and reducing the space intermediate the side portions 1e and 1f of the angularly disposed cutaway slotted portion 1c of the hose engaging collar 1. As these side portions 1e and 1f of the cutaway slotted portion 1c come closer together the flexible hose is compressed upon the outer side of the portion B' of the solid tubular fluid conductor B, as shown best in Fig. 2 of the drawing. The flange portions 2a and 2b of the collar engaging clamp members 2 provide great strength of the collar engaging clamp members 2 arranged to conduct forceful clamping pressure upon the hose engaging collar 1 when forced together by means of the bolts 3.

Though I have shown and described a particular construction, combination and arrangement of parts and portions, I do not wish to be limited to this particular construction, combination and arrangement but desire to include in the scope of my invention, the construction, combination and arrangement substantially as set forth in the appended claims.

Having thus described my invention, what I claim as new and desire to secure by Letters Patent is:

1. In a hose clamping device of the class described, the combination with a metallic tubular member provided with spaced annular flanges extending from its exterior and a hose member positioned over said metallic member between said flanges, of a clamp for said hose and metallic tubular member consisting of a band-like hose engaging collar provided with smooth inclined converging annular opposed outer surfaces and an angularly disposed cutaway slotted portion in one side thereof, opposed collar engaging members provided with annular clamping portions positioned on said smooth inclined converging annular opposed outer surfaces of said hose engaging collar and bolts extending through both of said collar engaging clamp members and nuts screw threaded on said bolts arranged to force said collar engaging clamp members toward each other and clamp said hose on said metallic tubular member.

2. In a hose clamping device of the class described, the combination with a metallic tubular member provided with spaced annular flanges extending from its exterior and a hose member positioned over said metallic member between said flanges, of a clamp for said hose and metallic tubular member consisting of a band-like hose engaging collar provided with smooth inclined converging annular opposed outer surfaces and an angularly disposed cutaway slotted portion in one side thereof, opposed collar engaging members provided with annular clamping portions positioned on said smooth inclined converging annular opposed outer surfaces of said hose engaging collar and bolts extending through both of said collar engaging clamp members and nuts screw threaded on said bolts arranged to force said collar engaging clamp members toward each other and clamp said hose on said metallic tubular member, said collar engaging clamp members provided with outlining angular flange portions engaging the sides of said nuts for holding the same in certain position.

MILTON W. NENNEMAN.